Oct. 27, 1964   D. MacDOUGALL   3,154,451
PRODUCTION OF REINFORCED ENDLESS RUBBER BELTS OR BANDS
Filed March 11, 1960
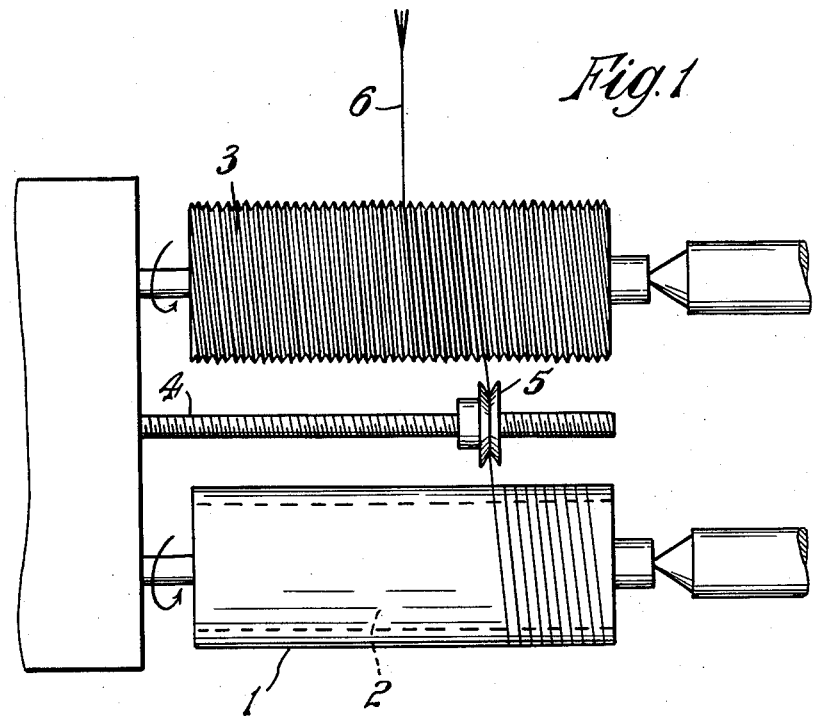
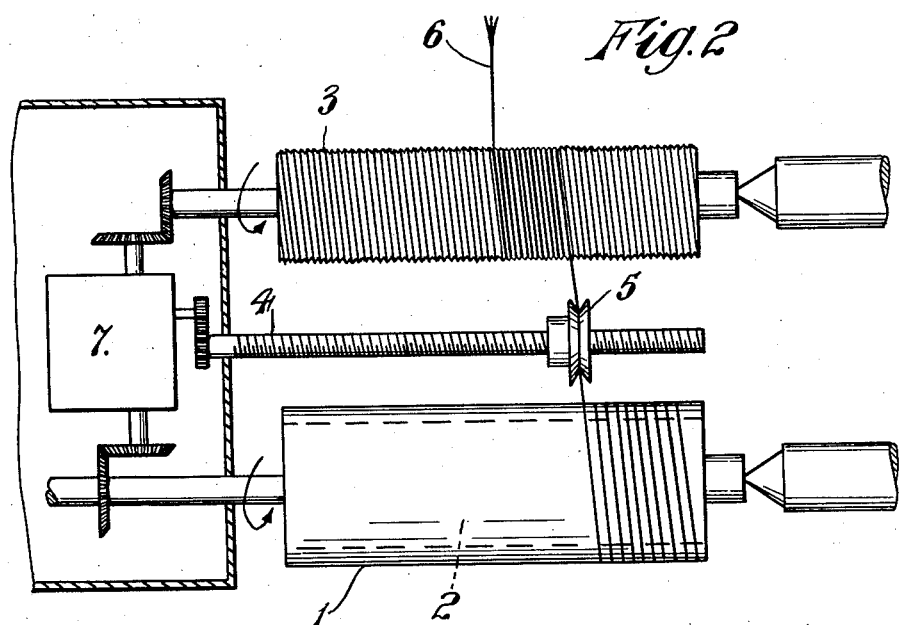
INVENTOR
DANIEL MacDOUGALL
BY

3,154,451
PRODUCTION OF REINFORCED ENDLESS RUBBER BELTS OR BANDS

Daniel MacDougall, Newcastle-upon-Tyne, England, assignor to George Angus & Company Limited, Newcastle-upon-Tyne, England
Filed Mar. 11, 1960, Ser. No. 14,419
Claims priority, application Great Britain Feb. 19, 1960
8 Claims. (Cl. 156—137)

This invention relates to the production of reinforced endless rubber belts or bands and particularly to relatively small flat belts or bands which are used for supporting and conveying fibres in the drafting of textile fibres and are often called draft aprons.

The present invention is specially applicable to a method of manufacturing an endless rubber band or belt, as described in application Serial No. 614,619 (Balkin et al.), filed October 8, 1956, now Patent No. 3,008,860, consisting of a unitary layer of rubber having a helical cord reinforcement embedded completely within the thickness of the rubber layer, in which a layer of rubber of a thickness to provide the desired thickness of a finished band or belt is prepared and placed as a sleeve in plastic condition on a cylindrical mandrel and cord is wound, under controlled tension, helically on to the layer of rubber on the mandrel, so that, by the act of winding, the cord cuts into and becomes embedded completely within the thickness of the rubber layer.

More particularly, the present invention provides a method and apparatus for winding cord helically on to a layer of rubber on a cylindrical mandrel so as to ensure that the helical convolutions of cord are of constant diameter. When applied to the above-described embedding method, the invention ensures that the cord is evenly embedded within the thickness of the rubber layer.

Although intended primarily for use in the above-described embedding method, the invention could be applied in other methods involving helical winding of cord.

According to the present invention, in a method of manufacturing an endless rubber band or belt wherein cord is wound helically on to a layer of rubber carried on a rotating cylindrical mandrel, the cord, in its path to the layer of rubber on the mandrel, is wrapped around a cylindrical gauging mandrel, axially parallel to and rotated with the rubber-carrying mandrel, the gauging mandrel having an effective diameter, determining the diameter at which cord is wrapped thereon, and being rotated at a rate according to the desired diameter of the convolutions of cord in the finished belt or band.

In the simplest way of carrying out the invention, the gauging mandrel is rotated at the same rate as the rubber-carrying mandrel and the effective diameter of the gauging mandrel is substantially equal to the desired diameter of the cord convolutions but not exactly equal thereto because other factors, particularly an allowance for stretch and subsequent recovery of the cord and rubber, must be taken into account as described below.

In an alternative way of carrying out the invention, enabling one gauging mandrel to be used with several sizes of rubber-carrying mandrels, the gauging mandrel has an effective diameter different from that of the rubber-carrying mandrel and the ratio of the rates of rotation of the two mandrels is substantially in inverse proportion as their effective diameters. In determining the ratios of the diameters and rates of rotation of the mandrels, stretch and other factors are taken into account.

The length of cord wound on to the rubber-carrying mandrel at each rotation thereof is the length required to form one convolution of the cord in the finished belt or band, neither too little, which would cause the cord to cut too deeply into the rubber, nor too much, which would allow the cord to slacken and not embed itself sufficiently in, or wind evenly upon, the rubber.

Preferably, the cylindrical surface of the gauging mandrel is formed with a screw-thread of which the pitch is proportional to that required for the helical cord reinforcement and the trough diameter is the effective diameter controlling the diameter of the cord convolutions.

Preferably, to avoid the cord slipping, several convolutions of cord are wrapped around the gauging mandrel when the apparatus is threaded up and thereafter the same number of convolutions are constantly on the gauging mandrel as winding takes place, a new convolution being taken up as each convolution is successively transferred to the rubber layer.

As mentioned above, factors other than the desired diameter of the convolutions of the cord reinforcement must be taken into account, these including the facts that the rubber sleeve is slightly stretched on its mandrel, the cord is stretched during winding and shrinkage of materials takes place subsequent to winding. A formula for determining the trough diameter of the screw-thread of the gauging mandrel when making draft aprons by an embedding method, using a butadiene-acrylic nitrile copolymer rubber and Terylene (registered trademark) yarn cord, as in the example given in the above-mentioned application Serial No. 614,619, is as follows:

Trough diameter=F×(inside diameter of apron+apron wall thickness—thickness of cord)

In the above formula, F is a factor which is slightly less than unity but the exact value of which must be determined by test, before quantity production of any particular apron, according to the viscosity and thickness of the rubber used, the tension applied to the cord before winding on to the gauging mandrel and the time which is to elapse between winding of the cord and vulcanisation.

Two examples of the relevant part of apparatus, for carrying out the invention in the manufacture of draft aprons by the embedding method, are shown on the accompanying drawing which comprises two similar diagrammatic plan views, F. 1 and FIG. 2.

Referring first to the use of apparatus as shown by FIG. 1, an extruded tube 1 of very plastic and tacky rubber, prepared as described in application Serial No. 614,619, now Patent No. 3,008,860, is placed on a mandrel 2. As examples of the thickness of the rubber, for aprons of more than 50 mm. (say 2″) inside diameter, the extruded tube is of 0.060″–0.070″ thickness, for aprons of finished thickness 0.040″ or less, and for aprons of more than 0.040″ finished thickness, the tube is 0.070″ of more than 0.040″ finished thickness, the tube is 0.070″–0.080″ thick. The mandrel 2 is of slightly larger diameter than the inside diameter of the finished apron, say 0.010″ larger in the examples given above.

A gauging mandrel 3 has a screw-thread machined in its cylindrical surface, say with a pitch of 32 threads per inch, and a trough diameter determined by the formula given above in which F has a value between 0.95 and 0.996.

The mandrels 2 and 3 are placed in a twin head-stock lathe for synchronous rotation with their axes parallel as shown. Between the mandrels, and axially parallel thereto, a lead screw 4 carries a guide pulley 5, which is freely rotatably mounted on a nut which is traversed along the lead screw 4 by rotation of the latter.

With the apparatus as illustrated may be used cord delivering and tensioning apparatus such as is described in application Serial No. 614,619, now Patent No. 3,008,860, or other suitable cord-feeding apparatus, with or without means for coating the cord with rubber solution, and the cord 6, Terylene thread in the above examples, is threaded through the apparatus and wrapped around the gauging mandrel 3, preferably at least six turns, before being anchored, by an overlapped turn, to the beginning of the rubber sleeve 1 on the mandrel 2.

The mandrels, and lead screw 4, are now rotated to wind the cord helically along the rubber sleeve with a pitch equal to that of the screw-thread on the gauging mandrel 3 and a penetration into the rubber determined by the trough diameter of the screw-thread.

When winding is finished, the mandrel 1, complete with rubber and wound cord layer, is conditioned, such as by being allowed to stand for a given time at room temperature or by being placed in an oven at low-temperature (80–100° C.) for 30 minutes, to soften further the rubber and relax the tension in the cord, and is then wrapped in damp cloth and vulcanised in a steam pan.

After vulcanisation, the wrapping is removed and the cool, cord-reinforced, rubber tube is ground to finished size in two or more operations. The tube is then removed from the mandrel and cut transversely into belts or bands each forming a draft apron of desired width.

An alternative example of apparatus for carrying out the invention is shown by FIG. 2 and corresponding parts have the same reference numerals as in FIG. 1.

In the example of FIG. 2, the gauging mandrel 3 is of smaller diameter than the mandrel 2 and is driven through a change-speed gear box 7 so that its rate of rotation is higher than that of the mandrel 2 in inverse ratio to the effective diameters of the two mandrels.

The pitch of the screw-thread on the gauging mandrel 3 is closer than that required for the convolutions of the cord in the rubber tube 1 and the lead screw 4 is driven from the gear box 7 so that it traverses the pulley 5 at a rate to lay the cord 6 on the rubber 1 with the desired pitch. In practice, the distance apart of the gauging mandrel 3 and pulley 5 can be such as to allow for any necessary spray in the path of the cord 6 from one to the other.

Also, the length of the gauging mandrel 3 may be greater or less than that of the mandrel 2 and if a relatively short gauging mandrel 3 is used it can be traversed axially during its rotation so as to keep step with the pulley 5.

In other respects, the apparatus of FIG. 2 is used in a similar manner to that of FIG. 1.

I claim:

1. In a method of manufacturing an endless band of rubber having embedded therein a helical reinforcement of cord, wherein cord is led to and wound helically onto a layer of rubber carried on a first rotating cylindrical mandrel, the steps of forming said cord into a helix on a second mandrel in leading said cord to said first mandrel and then winding convolutions of cord successively from one end of said helix onto said layer of rubber to embed the same therein.

2. A method according to claim 1, in which simultaneously with said winding of convolutions of cord from said one end of said helix additional convolutions of cord are formed at the other end of said helix.

3. A method according to claim 2, in which said helix is formed with substantially the same diameter and substantially the same helical pitch as said helical reinforcement in said band.

4. A method according to claim 1, in which said helix is formed with a diameter different from the diameter of said helical reinforcement in said band and said winding of convolutions of cord from said helix is effected by rotation of said mandrels at rates of which the ratio is substantially in inverse proportion as the diameters of said mandrels.

5. In a method of manufacturing an endless band of rubber having embedded therein a helical reinforcement of cord, wherein said cord is led to and embedded by winding onto a band of rubber carried on a first rotating cylindrical mandrel, the steps of rotating said cylindrical mandrel at a given angular velocity, and positively feeding said cord from a second mandrel at a linear velocity equal to the tangential velocity of said rubber at the depth whereat said cord is desired to be embedded.

6. Apparatus for helically winding cord and comprising a first rotatably mounted cylindrical mandrel, a second rotatably mounted cylindrical mandrel axially parallel to said first mandrel, the cylindrical surface of said second mandrel having a screw-thread, cord-guiding pulley means between and axially parallel to said mandrels, means for rotating said mandrels, and means for traversing said pulley means axially parallel to said mandrels.

7. Apparatus according to claim 6, in which the trough diameter of the screw-thread of said second mandrel is slightly greater than the diameter of said first mandrel and said means for rotating said mandrels is arranged to effect synchronous rotation of said mandrels.

8. Apparatus according to claim 6, in which the trough diameter of said second mandrel is smaller than the diameter of said first mandrel and said means for rotating said mandrels comprises gear means for rotating said mandrels at rates in inverse proportion as said diameters.

References Cited in the file of this patent

UNITED STATES PATENTS

| | | |
|---|---|---|
| 1,432,531 | Chandler | Oct. 17, 1922 |
| 2,298,867 | Case | Oct. 13, 1942 |
| 2,482,702 | Billmeyer | Sept. 20, 1949 |
| 2,556,827 | Striano | June 12, 1951 |
| 2,614,058 | Francis | Oct. 14, 1952 |
| 2,669,333 | Johnson | Feb. 16, 1954 |
| 2,880,781 | Carlson | Apr. 7, 1959 |
| 2,893,651 | Singleman | July 7, 1959 |
| 3,008,860 | Balkin et al. | Nov. 14, 1961 |

FOREIGN PATENTS

| | | |
|---|---|---|
| 638,082 | Great Britain | May 31, 1950 |